United States Patent Office 3,429,751
Patented Feb. 25, 1969

3,429,751
ELECTROLYTICALLY DISSOLVING ONE ALLOY COMPONENT FROM A RANEY-TYPE ALLOY ENCASED IN A POROUS INERT MATERIAL
Otto Heuse, Kronberg, Taunus, Germany, assignor to Farbwerke Hoechst Aktiengesellschaft vormals Meister Lucius & Bruning, Frankfurt am Main, Germany
No Drawing. Filed Nov. 10, 1965, Ser. No. 507,223
Claims priority, application Germany, Nov. 18, 1964, F 44,464
U.S. Cl. 136—120
Int. Cl. H01m *13/06*
8 Claims The present invention relates to the manufacture of oxygen solvent electrodes having a supporting skeleton with interposed metal in porous, gas-permeable form.

The cathodic reduction of oxygen is an inhibited process. When fuel cells are operated, one semicell reaction of which is the cathodic reduction of oxygen to water, this inhibition is detrimental because it limits the current to be taken off the cells.

In the course of endeavours to manufacture electrodes with little inhibition it has been ascertained that a close relationship exists between the catalytic properties of the metals to be considered and their qualification as electrode material. This knowledge led to the use of metals in a catalytically active, finely distributed form for the manufacture of electrodes and further to the construction of so-called double-skeleton electrodes. The latter show a distinctly diminished inhibition of the cathodic reduction of oxygen compared with polished metal electrodes.

Double-skeleton electrodes are porous, but mechanically solid structures of highly active metal which are prepared in a manner such that a Raney alloy of a noble metal and a not noble metal is pulverized and mixed with an unalloyed metal powder. The mixture is pressed to plates and sintered. The base metal is then dissolved in the plates with the aid of a suitable liquid, mostly an aqueous alkaline solution. The added unalloyed metal is not dissolved and forms a supporting skeleton conferring upon the electrode the required stability. When gasses are to be reacted, double-skeleton electrodes are preferably used in the form of diffusion electrodes. Diffusion electrodes are characterized by a hollow space in their inside, into which is pressed the gas to be reacted. In the state of operation a three-phase limit of gas/electrolyte/electrode metal forms in the electrode. By the large inner surface and the ready after-diffusion of the gas, a high conversion of substance and a high current density are obtained, referred to the geometric surface of the electrode. The pressure of the gas must be inversely equal to the capillary pressure of the liquid in the channels of the electrode. This puts a very great strain on the uniformity of the pores because the gas escapes through pores which are too wide while pores which are too small do not participate in the conversion for they fill with the electrolyte. The required uniformity of the pores is obtained by producing pressed structures of granules of different granulation in two or three layers. By this measure the pores become finer towards one side of the electrode. This side is exposed to the electrolyte. However, this process renders very difficult the manufacture of electrodes.

It has now been found that oxygen solvent electrodes having a supporting skeleton with interposed metal in porous, gas-permeable form can be prepared in advantageous manner by dissolving the less noble component of an alloy of the electrode metal with the less noble metal when part of the surface of the alloy is covered and the alloy is exposed as anode in an electrolytic bath to a current flow with a current density of 1 to 20 milliamperes until at least 80% by weight of the less noble component have been dissolved in the parts accessible to the current.

Suitable electrode metals are silver, gold, platinum, palladium and nickel or alloys of the said metals with one another. Mercury is also suitable, provided that it is used as component of an alloy. Electrodes of silver, silver/gold alloys and solid gold amalgam are preferred.

As less noble constituents of the alloys there can be used copper, zinc, cadmium, aluminum, or silicium, or alloys of the said metals with one another. The metals of this series are selected from the point of view of their alloying property or miscibility with the noble metal selected from the upper series.

As electrolyte aqueous solutions of metal salts are preferably used as known from electroplating. Solutions containing ions of the less noble metal are preferred.

For the manufacture of an electrode an alloy is prepared from the electrode metal and a less noble metal and the alloy is put into the desired shape. Sheets having a thickness of several millimeters are preferred. It is favorable if the alloy contains at least 60% by weight and more advantageously 80% by weight of the less noble metal. The upper limit for the less noble metal is about 90% by weight. The alloy is placed into an electrolytic bath and connected as anode opposite another electrode which may consist of the less noble metal. Between the anode and the cathode a voltage is adjusted at which the less noble metal of the alloy is dissolved but not the noble metal. The noble metal does not remain unchanged during these processes. In the course of dissolution it recrystallizes in the forming porous crystal lattice. By adjustment of the current density the fineness of the grain can be influenced, particularly on the surface. The lower the current density, the finer the grain. In order to produce the desired reduction of the pores towards the surface of the electrode it is thus only necessary to diminish the current density at the end of the electrolysis. The current density can be altered by the voltage between anode and cathode, by the selection of the electrolyte and by adding substances inhibiting the ion mobility in the electrolyte, for example glue. For condensing the crystal lattice it may be advantageous to reverse the direction of current for a short interval and to separate a small amount of metal with a high cathodic current density.

The current cannot act or acts to a reduced extent only on the covered parts of the anode. By this measure a supporting lattice is formed which consists of the original alloy and in which spaces filled with the porous catalyst metal are to be found.

The surface of the alloy can be covered with a perforated plastic plate. The degree of covering advantageously ranges between 30 and 50% of the geometrical surface, 50 to 70% of the geometrical surface being accessible to the current.

Alternatively, the alloy can be compressed between two inert, porous supporting plates and then subjected to electrolysis. When very finely porous plates are used it is advantageous when the plate material has a small inherent conductivity, since otherwise the resistance between anode and cathode is very high. Especially suitable in this respect is porous carbon. The porous metal formed during electrolysis gets so firmly entangled with the carbon that the latter may serve as supporting skeleton.

The process according to the invention is very simple to carry out. It is especially advantageous for the manufacture of large electrodes. The electrodes produced by the process of the invention are mechanically stable and have uniform pores. When being used they exhibit a slight overvoltage and have a long lifetime. The specific conversion of substance and the current densities to be obtained are high.

The electrodes produced by the process according to the invention can be used in fuel cells and also in measuring technique for the known electrochemical determination of very small amounts of oxygen in gases. In the latter case the oxygen solvent electrodes according to the invention are advantageously used instead of the known gold wire electrodes which are externally surrounded by the gas.

The process according to the invention likewise permits the manufacture of hydrogen solvent electrodes or electrodes for similar reactions. The alloy and the conditions of dissolution must be adapted to the special requirements in each case.

The electrode metal can also be used in compact form or in comminuted form as catalyst for chemical reactions.

The following examples serve to illustrate the invention but they are not intended to limit it thereto.

EXAMPLE 1

A 1 millimeter thick copper/silver sheet consisting of 90% by weight of copper and 10% by weight of silver was soldered on a silver box into which a small silver tube had been soldered. The copper/silver sheet was covered with a plastic plate with 50% perforations. The sheet was then used as anode in an electrolytic bath, the cathode being a copper sheet. The electrolyte was 1 N copper sulfate solution acidified with sulfuric acid of about 10% strength. The voltage between anode and cathode was always smaller than 180 millivolts. At the beginning, the current amounted to about 13 milliamperes/square centimeter. In the course of one day it was reduced to about 1 milliampere/square centimeter. The electrolyte had a temperature of 75° C. After dissolution of about 80% by weight of the copper electrolysis was terminated. The sheet was porous and contained on the inside a supporting lattice of copper because of the covering.

The plastic covering was removed and the box was measured as semielement in known manner in an electrolytic bath under slight oxygen pressure. The pressure was adjusted in a manner such that oxygen bubbles did not yet pass through the diaphragm. With a current intensity of 30 milliamperes/square centimeter the measurement against a calomel comparison electrode indicated a voltage drop of about 200 millivolts vis-a-vis the zero potential.

EXAMPLE 2

A disk having a diameter of about 60 mm. and a thickness of 1 mm. was made from a copper/silver alloy (proportion 80/20) and thoroughly annealed. A small silver tube which was open at the lower and upper side was soldered onto the disk. A disk of porous carbon having a diameter of about 70 mm. and a thickness of about 4 mm. was turned out so that the inserted metal sheet was on the same level with the surface of the border. A second porous carbon disk of the same size having a thickness of about 3 mm. was placed on the first one and the contacting borders were bonded together with the small silver tube projecting at the upper side.

The copper was dissolved in the same manner as in Example 1. After dissolution of about one half of the amount of copper out of the copper/silver sheet, the anode was reversed and the remainder of the copper was dissolved in the same manner.

The anode was rinsed and used as oxygen solvent electrode in a fuel cell. Through the tube oxygen was pressed into the space between the carbon disks filled with silver granules. The tube simultaneously served for current delivery. As anodes two nickel nets filled with Raney nickel were used, which were in parallel position and at a small distance with respect to the two surfaces of the disk-shaped oxygen solvent electrode. The nickel nets were conductively connected with one another. The electrolyte was a 6 N potassium hydroxide solution in which 12% by weight of ethylene glycol had been dissolved as fuel.

With a terminal voltage of 480 millivolts the fuel cell supplied a current of about 2.7 amperes and with a terminal voltage of 650 millivolts a current of about 1.35 amperes, corresponding to current densities of 48 milliamperes/square centimeter and 24 milliamperes/square centimeter, calculated on the geometric cathode surface.

With replacement of the consumed fuel, voltage and current were still as high as at the beginning after a period of 18 days.

I claim:

1. A process for the manufacture of oxygen solvent electrodes having a supporting skeleton with interposed metal in porous, gas-permeable form from an alloy of the electrode metal with a less noble metal by dissolution of the less noble component, which comprises covering the surface of the alloy with an inert material, at least part of which has areas of porosity, and exposing the alloy via said porous area in an electrolytic bath as anode to a current flow with a current density of 1 to 20 milliamperes until at least 80% by weight of the less noble component of the alloy have been dissolved in the parts accessible to the current.

2. Process of claim 1, wherein the electrode is produced from an alloy containing 60 to 90% by weight of the less noble component.

3. Process of claim 1, wherein copper is dissolved out of a silver/copper alloy.

4. Process of claim 1, wherein the anodic current density of initially 15 milliamperes/cm.$^2$ is reduced in the course of electrolysis to 1 milliampere/square centimeter at the end of the dissolution process.

5. Process of claim 1, wherein the direction of current is reversed for a short interval during dissolution.

6. Process of claim 1, wherein during dissolution the anode is covered with a partly perforated plate of an inert material.

7. Process of claim 1, wherein during dissolution the anode is covered with a porous plate of an inert material.

8. Process of claim 1, wherein during dissolution the anode is covered with a plate of porous carbon.

References Cited

UNITED STATES PATENTS

| 2,069,206 | 2/1937 | Axtell | 204—146 |
| 3,097,149 | 7/1963 | Lacroix | 204—146 |

ROBERT K. MIHALEK, *Primary Examiner.*

U.S. Cl. X.R.

204—143, 146